United States Patent [19]
Wright et al.

[11] 3,808,401
[45] Apr. 30, 1974

[54] ELECTRICALLY HEATED PORTABLE LUNCH BOX

[76] Inventors: Ralph Wright, Mobile, Ala.; George Spector, both of 3615 Woolworth Bldg., 233 Broadway, New York, N.Y. 10007

[22] Filed: Nov. 28, 1972

[21] Appl. No.: 310,121

[52] U.S. Cl............ 219/387, 165/58, 219/202, 219/521, 219/531, 219/533
[51] Int. Cl............ F27d 11/02, A21b 1/52
[58] Field of Search........... 219/202, 217, 385, 386, 219/387, 521, 524, 528, 531, 533; 165/58, 59

[56] References Cited
UNITED STATES PATENTS

| | | |
|---|---|---|
| 3,692,975 | 9/1972 | Markus et al. .................... 219/202 |
| 2,584,435 | 2/1952 | Doerr .................................... 165/58 |
| 2,976,390 | 3/1961 | Stemp .................................. 219/387 |
| 3,482,078 | 12/1969 | Milne ................................... 219/387 |
| 2,728,841 | 12/1955 | Whitlock ............................. 219/217 |
| 2,839,654 | 6/1958 | Jones et al. ......................... 219/387 |
| 3,130,289 | 4/1964 | Katzman et al. ................ 219/528 X |

Primary Examiner—Volodymyr Y. Mayewsky

[57] ABSTRACT

A portable food storage chest comprising a first insulated chamber for storing food in cold condition; a second chamber for warming or heating food, and electrical means for heating the second chamber, said means being adapted to receive electric power either from a main source or from an automobile battery.

2 Claims, 3 Drawing Figures

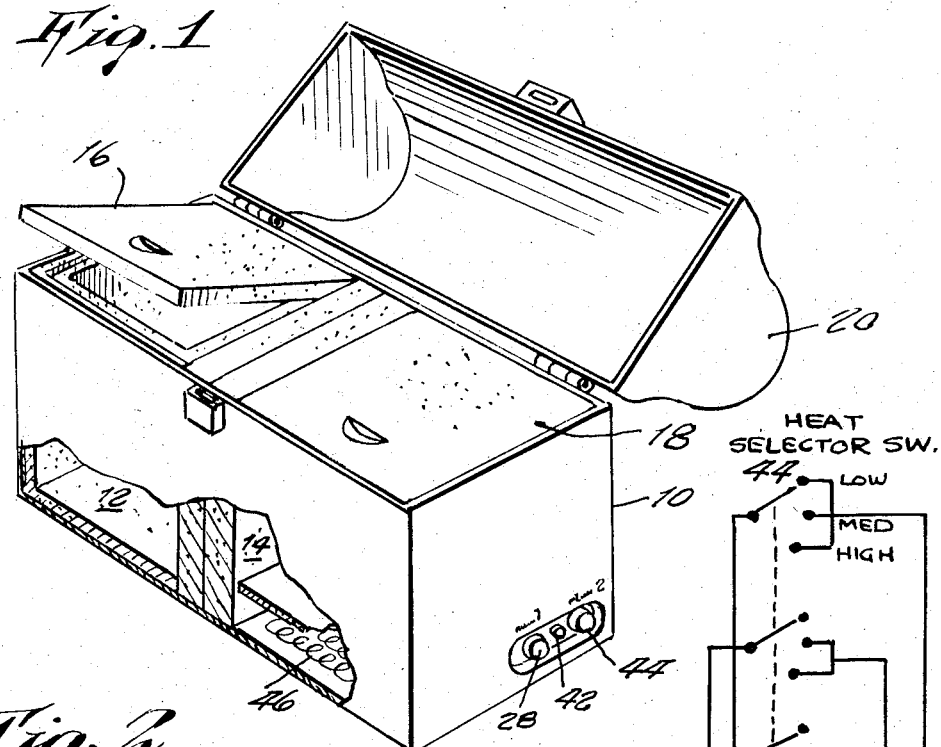
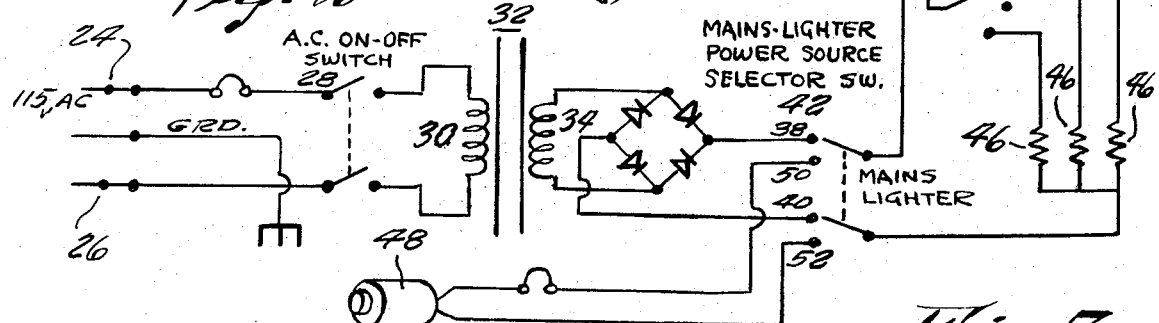
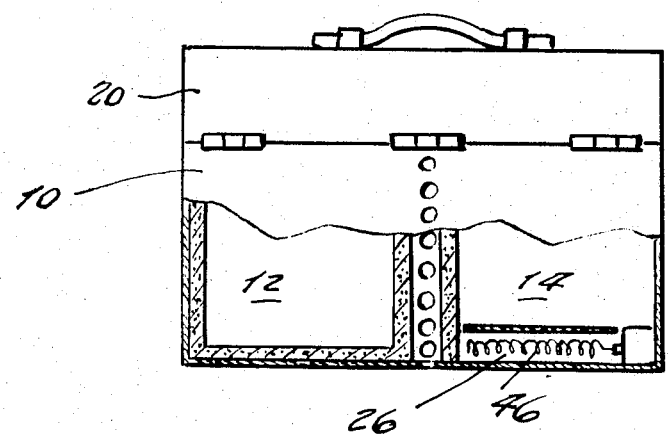

ELECTRICALLY HEATED PORTABLE LUNCH BOX

SUMMARY OF THE INVENTION

Our invention is directed toward a food chest which can be used both in the home and while traveling in an automobile to store food and make same available both in hot and in cold condition.

To this end, the chest has first and second chambers disposed side by side. The first chest is insulated and is adapted to receive cold food and store same at temperature. The second chamber cooperates with electrical means for heating same whereby food can be inserted and warmed or heated.

The electrical means is adapted to be connected either to a main source and thereby operate on household current or to be connected to the cigarette lighter socket of an automobile whereby power is obtained from the automobile battery and the chest can be operated while traveling.

BRIEF DESCRIPTION OF THE DRAWINGS

In the drawings:
FIG. 1 is a perspective view of our invention;
FIG. 2 is a circuit diagram thereof; and
FIG. 3 is a cut-away front view of our invention.

DETAILED DESCRIPTION OF PREFERRED EMBODIMENTS

Referring now to FIG. 1 – 3, a chest 10 has two compartments 12 and 14 disposed side by side, each accessible via a hinged top lid 16 and 18 underneath the hinged cover 20 of the chest.

Compartment 12 is heavily insulated and is used for storing cold food and holding same in cold condition in a manner similar to a vacuum bottle.

Compartment 14 has a bottom recess 22 in which heating means is disposed whereby food can be stored and maintained in warm condition or can be heated.

To the end, alternating current from a suitable means source such as a conventional 115 volt 60 Hertz outlet can be supplied via a conventional plug (not shown) across terminals 24 and 26. If the alternating current on-off switch 28 is turned on, this voltage is applied across the primary winding 30 of transformer 32. The secondary winding 34 is connected to the input of a rectifier bridge circuit 36. The output of this circuit is a rectified voltage of about twelve volts and appears between terminals 38 and 40. Provided that the mains - lighter power source selector switch 42 is in MAINS position, this rectified voltage can be supplied via heat selector switch 44 to heater coils 46. When switch 44 is in low position, one coil is energized. Two coils are energized when the switch is in MEDIUM position, and three coils are energized when the switch is in HIGH position.

When switch 44 is in the low position current from the car battery or appropriate external source flows into switch 44 and then only through the coil 46 (furthest to the right in FIG. 2) because the other two coils are disconnected when the switch 44 is in low. When switch 44 is in medium position the center coil 46 and the coil furthest to the right receive current with the third coil (furthest to the left in FIG. 2) being disconnected because the terminals which correspond to the high position are not connected to the current flow. When in the high position, all three terminals connected to the corresponding three coils receive current through switch 44 thereby energizing all three coils. For sake of brevity the condition of the switch in medium and high positions is not illustrated. Suffice to say it is obvious that switch 44 provides a similar set of three terminals wherein each terminal has three contact posts. In each position of the switch three corresponding posts of each terminal are simultaneously connected to the source of current. However, in the low position only one coil is connected to switch; in the medium position two coils, and in the high position, three coils.

Alternatively, plug 48 is adapted to fit detachably into the lighter socket of a vehicle whereby the battery voltage, typically twelve volts, is applied through socket and plug across terminals 50 and 52.

When switch 42 is in the LIGHTER position, the battery voltage is applied through switch 44 and coils 46 as previously described.

Thus the chest can be used in the home as well as on motoring trips and the like.

While certain novel features of our invention have been shown and described and are pointed out in the annexed claims, it will be understood that various omissions, substitutions and changes in the forms and details of the device illustrated and in its operation can be made by those skilled in the art without departing from the spirit of the invention.

We claim:

1. A food storage chest comprising a chest having a pair of adjacent thermally and electrically insultated chambers separated by an insulated partition, an inner lid for each of said chambers, an outer housing and an outer cover enclosing said chambers, one of said chambers being for storing food in cold condition and the other of said chambers having electric heating means, said heating means comprising a first pair of terminals across which the main voltage is applied, a transformer having primary and secondary windings, an electric switch connected between the first pair of terminals and the primary winding, a second pair of terminals and a rectifier bridge connected between the secondary winding and the second pair of terminals, including a third pair of terminals and a plug connected to said third pair adapted for connection to a cigarette lighter socket in an automobile, in further combination with an electric coil heater and a power selector switch for serially connecting the second or third pair of terminals to the coil heater, further including a heat selector switch in series with the power selector switch, said coil heater comprising a plurality of coils in electrical parallel arrangement connected to corresponding heater terminals, said heater selector switch having a plurality of positions wherein one or more of said coils may be connected to the power source switch.

2. A chest as in claim 1 wherein the coil heater comprises three coils, and wherein each heater terminal has three posts corresponding to three magnitudes of heat generation, one of said coils being connected to three posts of one heater terminal, a second coil being connected to two posts of a second heater terminal and the third coil being connected to one post of the third heater terminal, said heat selector switch being movable to positions connecting one, two or three coils in series with the power selector switch.

* * * * *